United States Patent [19]

Miyagi

[11] Patent Number: 5,984,981
[45] Date of Patent: Nov. 16, 1999

[54] SALT MAKING METHOD AND APPARATUS

[75] Inventor: Showa Miyagi, 34-5, Aragusuku 2-chome, Ginowan-shi Okinawa 901-22, Japan

[73] Assignee: Showa Miyagi, Japan

[21] Appl. No.: 08/860,315

[22] PCT Filed: Feb. 26, 1996

[86] PCT No.: PCT/JP96/00438

§ 371 Date: Aug. 27, 1997

§ 102(e) Date: Aug. 27, 1997

[87] PCT Pub. No.: WO96/26899

PCT Pub. Date: Sep. 6, 1996

[30] Foreign Application Priority Data

Feb. 28, 1995 [JP] Japan ................................ 7-065058

[51] Int. Cl.⁶ ............................ C01D 3/06; A23L 1/237
[52] U.S. Cl. .................. 23/303; 23/295 R; 423/499.4; 159/16.2; 159/45
[58] Field of Search .................. 159/16.1, 16.2, 159/45; 23/303, 295 R; 423/499.4; 203/12, 49

[56] References Cited

U.S. PATENT DOCUMENTS

| 4,157 | 8/1845 | Stanton | 23/303 |
|---|---|---|---|
| 2,005,422 | 6/1935 | Hunicke et al. | 159/16.2 |
| 2,594,063 | 4/1952 | Norman | 159/16.2 |
| 3,325,154 | 6/1967 | McDonnell | 159/16.1 |
| 3,511,298 | 5/1970 | McDonnell | 159/16.1 |
| 3,599,701 | 8/1971 | Mollerstedt et al. | 159/16.1 |
| 3,918,916 | 11/1975 | Garrett | 23/303 |
| 4,334,886 | 6/1982 | Tani et al. | 23/303 |
| 4,776,956 | 10/1988 | Gannaway | 210/282 |
| 5,203,993 | 4/1993 | Arbisi | 159/16.1 |

FOREIGN PATENT DOCUMENTS

| 22-258 | 7/1948 | Japan . |
|---|---|---|
| 27-4378 | 5/1952 | Japan . |
| 5-59691 | 8/1983 | Japan . |
| 59-39363 | 9/1984 | Japan . |
| 5-328937 | 12/1993 | Japan . |
| 6-169721 | 6/1994 | Japan . |

OTHER PUBLICATIONS

Translation of JP 174974 (Application # 22–258) Mar. 1946.

*Primary Examiner*—Ngoc-Yen Nguyen
*Attorney, Agent, or Firm*—Marger Johnson & McCollom, P.C.

[57] ABSTRACT

A salt making method comprising putting a crude salt-water mixture (5) comprising crude salt or rock salt and bittern in a vessel (1), blowing the air from a pipe (7) into the mixture (5) with a pump (9), crystallizing the component salt out of the mixture (5), and precipitating the salt as a common salt (S) at the bottom of the vessel (1). The remainder of the mixture (5) is discharged through a filter (13) into a tank (17), where it is stored as a concentrated brine (15), which is then discharged through a filter layer (16) and a drain (18), and crude salt is dissolved therein to recycle as a crude salt-water mixture. The concentrated brine (15) may be used after being mixed with the extracts of aloe, mozuku (Nemacystis decipiens), rice bran, etc. The air may be blown into the mixture (5) under heating.

10 Claims, 3 Drawing Sheets

SALT MAKING METHOD AND APPARATUS

TECHNICAL FIELD

The present invention relates to a salt making method and apparatus, particularly a method and apparatus for making a natural salt.

BACKGROUND ART

It is known that common salt is made by depositing sodium chloride from sea water but, recently, natural salt, i.e., salt containing not only sodium chloride but also other sea water components such as minerals, has been attracted attention.

It is said that sea water contains almost the same components as those of human blood and, from this viewpoint, natural salt is considered preferred for human consumption.

As a result, the number of people who use natural salt for food is increasing and "salt application health method" in which a natural salt is applied to a human body and "salt bathing" in which a natural salt is added to bath water have been proposed, not only for health and cosmetic purposes but also as therapeutics of atopic dermatitis and so on.

As a method for making a natural salt, a method is known in which a crude salt, which is a kind of natural salt obtained by evaporating water from sea water by the heat of the sun, is dissolved in water and then heated at a temperature of 140 to 180° C. for 6 to 12 hours.

The above method has the problems that the heating requires a large amount of energy and a large apparatus and the salt becomes unnatural by deviation of the components or removal of bittern, particularly magnesium and calcium.

The present invention, considering the above problems, has the object to provide a salt making method and apparatus which are simple in construction and can make a natural salt.

DISCLOSURE OF THE INVENTION

In accordance with the present invention, to solve the above problems, a starting salt-water mixture liquid is put in a vessel, into which a gas is blown to deposit the component salt of the starting salt. The component salt is salt which comprises common salt as the major component but may contain components other than the salt.

The starting salt which can be used is not particularly limited and natural salt, crude salt, rock salt and others may be preferably used. The "blown gas" is a gas such as air but the gas is not limited to air.

The starting salt-water mixture liquid of the present invention is usually prepared by mixing a starting salt in an amount more than the saturation and water in a mixer or the like to dissolve and finely disperse the starting salt in the water. However, a brine concentrated from a sea water may be also used. A brine having a concentration less than the saturation concentration can be theoretically used as the starting material.

The starting salts as mentioned above usually contain dust, etc. which should be removed. In the salt making method of the present invention, impurities such as dust are separated during the process of dissolution and dispersion of the starting salt and are separately deposited.

The efficiency of the above operations, particularly the dust removing operation, is higher when the amount of the starting salt-water mixture liquid is somewhat large. When the amount of the starting salt-water mixture liquid is large, however, the time required for salt making becomes longer.

It is possible to shorten the time for salt making while effectively removing dust, by removing a portion of the starting salt-water mixture liquid from a bottom portion of the vessel while blowing a gas into the starting salt-water mixture liquid.

The starting salt-water mixture liquid may be prepared from a starting salt and water but, if bittern, etc. are added to a starting salt, the amount of dissolution of the starting salt in water is reduced and the component salt preferentially deposits before the bittern and, therefore, a starting salt-water mixture liquid containing a mixture of a starting salt and bittern, etc. may be used. When a mixture of a starting salt and bittern, etc. is used, a solution containing the bittern as a major component is removed by said removal so that the efficiency of the salt making is not reduced and the removed solution can be mixed with a starting salt for use as the starting salt-water mixture liquid in the next salt making process.

The present invention is characterized by making a salt basically at room temperature, without heating as in conventional salt making, so as to avoid selective deposition of the components of the starting salt and to produce a salt having a composition close to that of the starting salt, i.e., having a composition of a natural salt, and characterized by being able to add various useful additives as described later to the above salt. However, the salt making time may be shortened by heating at a temperature range which prevents or reduce selective deposition of the components of the starting salt and/or additive components. That temperature is a temperature about 5 to 15° C., more preferably about 5 to 10° C., above room temperature.

In accordance with the present invention, extracts of aloe, nemacystis, rice bran, turmeric, coral, carrot or ginseng, ink of cuttlefish, squalane, balsam pear, shell of crab, and the like, may be added to the starting salt-water mixture liquid so that these additives can be easily included in the final salt. Salts containing these additives are useful because of the additives, and are also useful as Chinese medicine salt, health salt, a cosmetic salt, etc. because of the synergistic effect of the additives and the above natural composition close to the composition of the natural salt.

Thus, when air is blown into a mixture (liquid) of a starting salt and water or bittern, the water is gradually evaporated to deposit the component salt from the mixture. While the starting salt in the mixture is gradually dissolved and becomes finer, dust or similar impurities are separated and light impurities float to the top of the mixture (liquid) and are separated from the salt components. It is considered that the air blowing also accelerates dissolution of the starting salt by stirring. The starting salt (component salt) releases impurities and deposits separately from the impurities. Since the salt deposits basically at room temperature, the component salt of the starting salt, whose dust and other impurities are removed, can deposit basically without change of the composition and the added extracts can be uniformly distributed in the deposit.

BEST MODE FOR CARRYING OUT THE INVENTION

Embodiment 1

Figure 1:
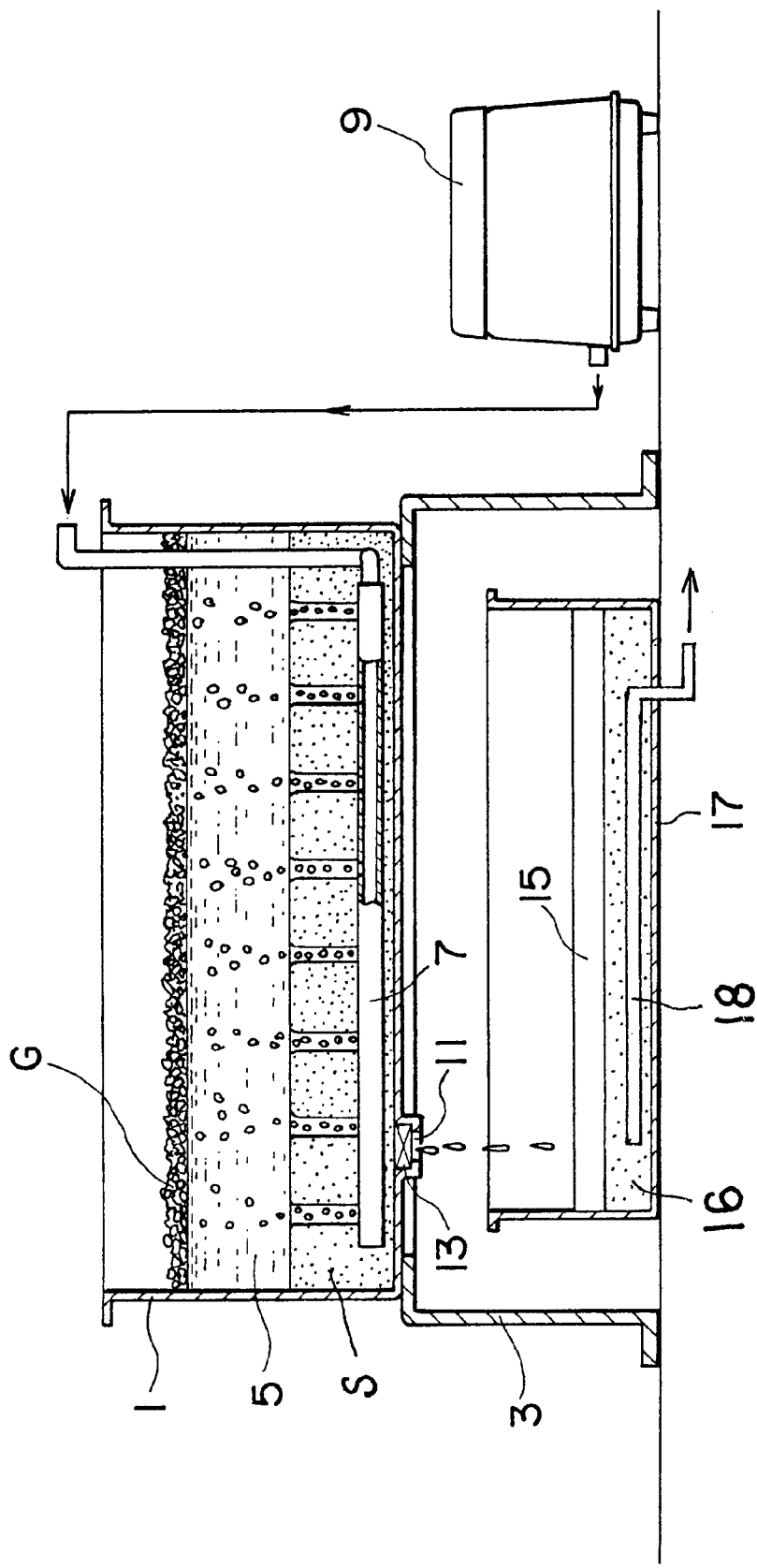
FIG. 1 is a sectional view of a salt making apparatus of the first embodiment of the present invention.
Figure 2:
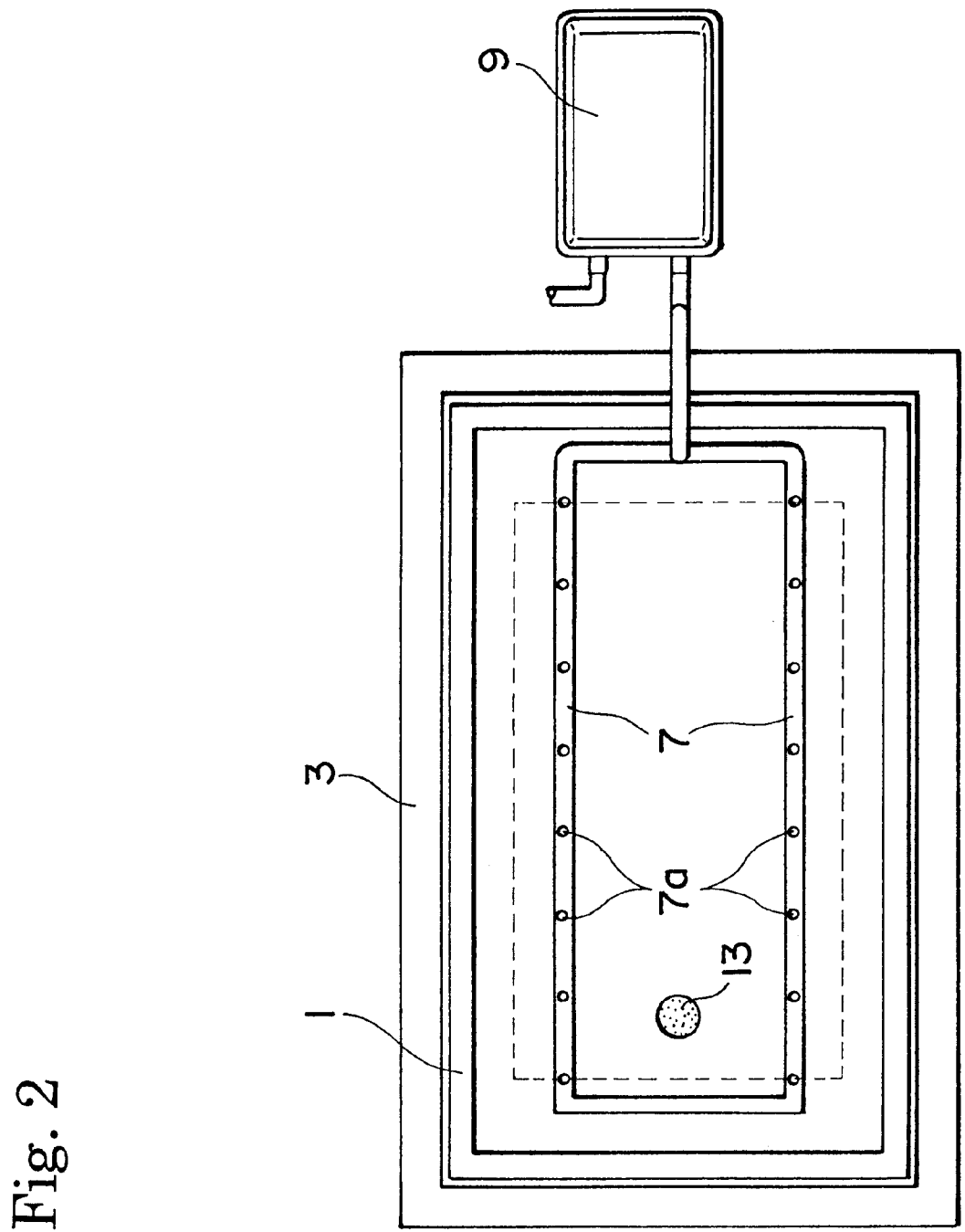
FIG. 2 is a plan view of the apparatus as shown in FIG. 1.

FIG. 1 is a sectional view illustrating an embodiment of the present invention and FIG. 2 is a plan view thereof. A vessel 1 is placed on a support 3 and the vessel 1 contains a starting salt-containing mixture liquid 5. In a bottom portion of the vessel 1, there is arranged a pipe 7 which is connected to an air feed pump 9. The pipe 7 has a plurality of pores 7a through which air is blown into the mixture liquid.

An exit port 11 is provided on the bottom of the vessel 1 and a filter 13, for example, a cloth, is provided to the exit port 11. A tank 17 is placed under the exit port 11.

The salt making method of this embodiment of the present invention is now described.

Crude salt and bittern are mixed at a ratio of about 1 to 1 in a mixer to form a mixture (liquid) 5 of the crude salt and water, which is then put in a vessel 1. An air feed pump 9 is operated to feed the air into a pipe 7 and blow the air as bubbles into the liquid through pores 7a.

After the air blowing, dust G in the crude salt forced upward by the bubbles floats on the surface of the liquid 5, which is then removed.

Ten to 15 minutes after the start of the air blowing, sodium chloride and other components in the upper portion of the liquid 5 deposit and precipitate as a salt S in the bottom portion of the vessel 1. The remainder gradually flows through a filter 13 into a tank 17 and is stored as a concentrated brine 15. The concentrated brine 15 mainly comprises bittern, but heavy impurities, if contained in the crude salt, may be removed by means of a filter provided inside or outside of the tank 17.

In the embodiment as shown in FIG. 1, a filter layer 16 is provided in a bottom portion of the tank 17 and an exit pipe 18 having pores is buried in the filter layer 16. The concentrated brine 15 passes through the filter layer 16 and is removed through the exit pipe 18. Thus the filtering is conducted. The filter layer 16 may be composed of various materials, but is composed of coral sand in the embodiment of FIG. 1. While passing through the coral sand, not only heavy impurities are removed, but also organic materials in the concentrated brine 15 are removed by means of microorganisms (filtering bacteria) since the coral sand contains microorganisms which decompose and remove organic materials such as dead bodies of planktons.

The deposited salt S is then removed from the vessel 1 and dried, for example, air dried. The first salt making is thus finished.

The second and later salt makings are conducted by dissolving a crude salt in the concentrated brine 15 which has been removed from the exit pipe 18. That is, a crude salt is dissolved in the concentrated brine 15 at a ratio of about 1 to 1 by a mixer or the like to form a crude salt-containing mixture liquid 5 and the same operations as in the first salt making are conducted. The same process is repeated afterwards. If the concentrated brine 15 decreases, water is appropriately added.

The concentrated brine 15 may have added thereto an extract(s) of aloe, nemacystis or rice bran, or other medical herbs or seaweeds, and the crude salt may be dissolved in this concentrated brine 15 containing these extracts, for use in salt making. To carry this out, for example, finely cut aloe is immersed in a concentrated brine (which is separated from the concentrated brine 15) in an amount of amount 1 kg per 10 kg of the concentrated brine for a certain time period, for example, one month, to obtain an aloe extract solution, which is filtered and then added to the concentrated brine 15 in an appropriate amount. Nemacystis and rice bran may be treated and used similarly. The aloe, nemacystis and rice bran may be used alone or in combination.

The thus made salt is a high quality natural salt which contains not only sodium chloride but also other useful components in the sea water, such as potassium, magnesium, calcium and so on.

Natural salt containing aloe or rice bran extract has excellent cosmetic effects, when it is used in "salt application" to a human body. of course, these extract-containing natural salts are also good as food and provide the specific effects of each extract to a human body. For example, it is said that aloe has a good effect on the esophagus, stomach, etc. and rice starch contains vitamin $B_1$, etc. and has a hair growth effect. Nemacystis is rich in minerals such as calcium. The amount of aloe, nemacystis or rice bran to be added may be determined appropriately depending on the use thereof.

In the above embodiment, the component salt can be deposited in a short time, since the concentrated brine 15 removed from the exit port 11 is used to dissolve and make a crude salt finer.

Also in the above embodiment, components which have good cosmetic or health effects on a human body, for example, aloe and other herbs and rice bran, can be added to a natural salt without separation thereof from the salt. If these components or additives are added in a crude salt-containing mixture liquid and simply heated in accordance with the conventional method, the high temperature heating causes separation of these components and does not provide a salt containing these components.

Embodiment 2

Figure 3:
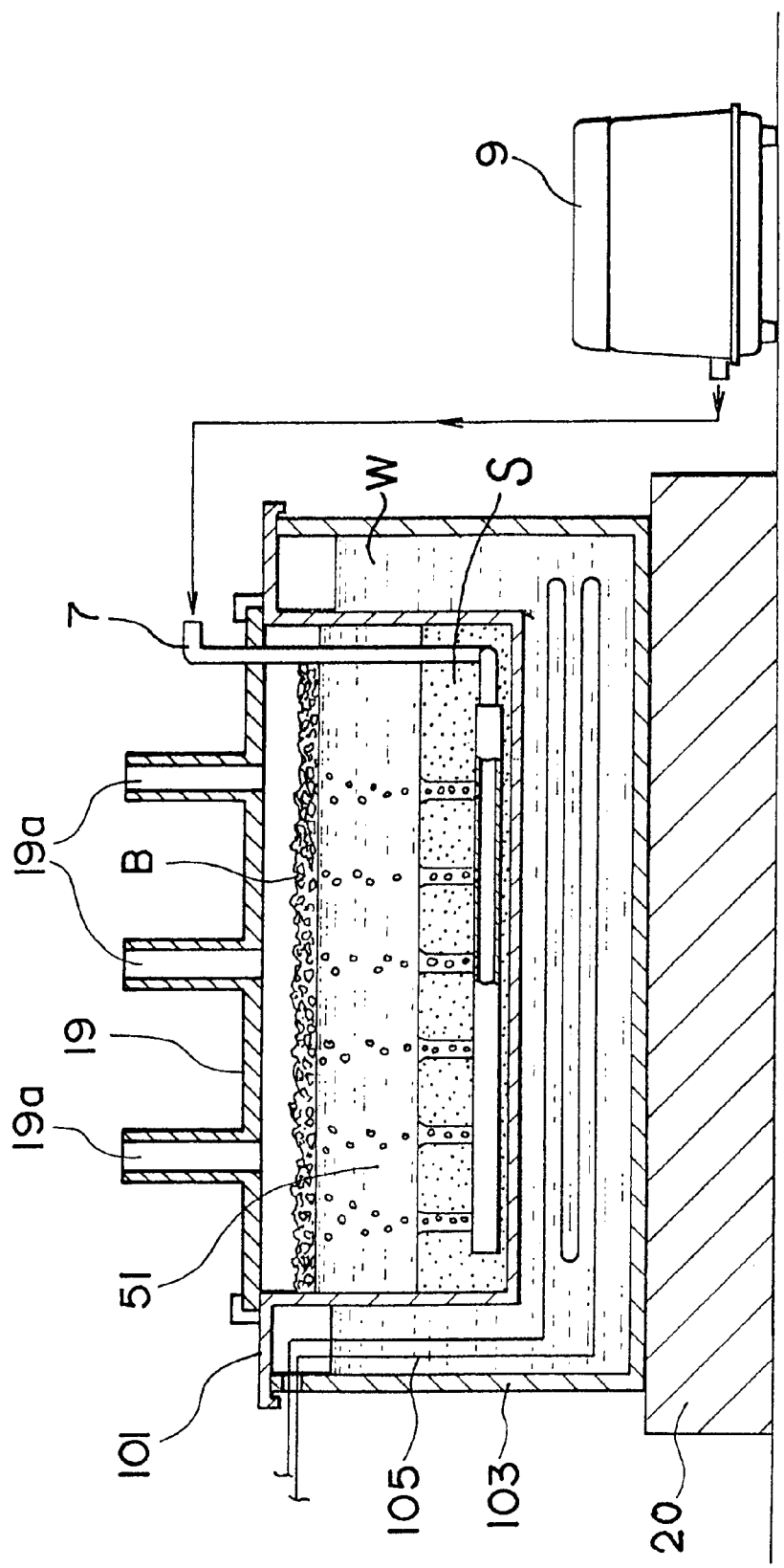
FIG. 3 is a sectional view of a salt making apparatus of the second embodiment of the present invention.

The second embodiment of the present invention is now illustrated in FIG. 3. In this embodiment 2, a vessel containing a crude salt containing-mixture liquid comprises two tanks, an inner tank 101 and an outer tank 103. In the inner tank 101, a pipe 7 is arranged and fed with air from an air pump 9, in the same manner as in the apparatus of embodiment 1. The inner talk 101 and outer tank 103 do not have an exit port as in the apparatus of embodiment 1. A cover 19 is provided on the top of the inner tank 101 so as to prevent flooding of the concentrated brine 51. The cover 19 is provided with a plurality of air ports 19a.

Water (or sea water) W is contained between the inner tank 101 and the outer tank 103, in which an electric heating wire 105 is arranged. The outer tank 103 is placed on a support 20.

The concentrated brine 51 to be used may be the concentrated brine 15 used in embodiment 1. The concentrated brine 51 may contain an extract of aloe, nemacystis, rice bran, or the like, as in Embodiment 1. Further, turmeric, powder of coral, carrot or ginseng, ink of cuttlefish, squalane, balsam pear, shell of crab, and the like may also be used as other additives. These extracts may be used alone or in a combination.

The method for making salt in embodiment 2 is now described.

A concentrated brine 51 is put in the inner tank 101 and air is fed to a pipe 7 from an air feeding pump 9, by which air bubbles are released from the pipe 7 into the concentrated brine 51.

The water W is heated by passing an electric current through the electric heating wire 105. The temperature of the concentrated brine 51 is set to be 5 to 10° C. higher than the temperature of the air fed from the pump 9 (the temperature of the surrounding air).

As the air is fed through the pipe 7, air rises as bubbles in the concentrated brine 51 up to the surface of the solution, and leaves through the air ports 19a. During this process, a large quantity of bubbles B are formed on the surface of the brine 51. The height of the air ports 19a is set such that the bubbles B do not overflow. Before long, sodium chloride and other components start to deposit near the surface of the brine 51, and precipitate as a salt S to a bottom portion of the tank 101. In about 6 hours, the water evaporates and a natural salt S is left in the inner tank 101. The deposited salt S is removed from the vessel 1 and dried, for example, air dried, to obtain a natural salt.

Since the natural salt made in this embodiment is obtained by evaporating all the water in the concentrated brine 51 and depositing the components in the concentrated brine 51, the natural salt contains bittern in an amount higher than that of the salt produced in embodiment 1 and is thus a more natural salt. The natural salt produced in this embodiment is finer than the natural salt made in embodiment 1. Moreover, natural salt containing an extract such as aloe has an effect depending on the type of the added extract. The effects of the aloe, nemacystis and rice bran are described in embodiment 1. Turmeric is said to have an effect on liver troubles and the powder of rock coral is a calcium component. The ink of cuttlefish has attracted attention due to its carcinostatic effect.

In embodiment 2, the salt can deposit in a short time period since air is blown while the solution 51 is being heated. In an example of embodiment 2, when the atmospheric temperature is 30° C., it takes about 6 hours to evaporate all the water of the brine 51 when the brine 51 is heated to 35 to 40° C., but it takes about 12 hours if not heated. If the temperature of the brine 51 is too high, an extract such as a plant extract is separated from the salt. Therefore, the temperature of the solution 51 is set to be a temperature at which the separation does not occur, for example, about 5 to 10° C. higher than that of the atmosphere.

In the above two embodiments, a mixed solution 5 of crude salt and bittern, or concentrated brine 15 or 51 obtained from the mixed solution 5 is used, but concentrated sea water obtained by concentrating the sea water may be also used.

As described above, the present invention has the effect in that a natural salt is made by a simple method or apparatus.

I claim:

1. A method for making a salt, wherein a starting salt-water liquid mixture is contained in a vessel and a gas is blown into the starting salt-water liquid mixture without heating the salt-water liquid mixture, thereby precipitating the salt component of said starting salt-water liquid mixture, wherein to said starting salt-water liquid mixture there is added an additive selected from the group consisting of extract of aloe, nemacystis, rice bran, turmeric, coral, carrot, ginseng, ink of cuttlefish, squalane, balsam pear and shell of crab, so as to add said additive to said precipitated salt.

2. The method according to claim 1, wherein said starting salt-water liquid mixture is prepared by mixing a crude salt or rock salt with bittern.

3. The method according to claim 1, wherein a bottom portion of said vessel is provided with an exit port through which a portion of said starting salt-water liquid mixture is removed while said gas is blown into said starting salt water liquid mixture.

4. The method according to claim 3, wherein a liquid portion of the starting salt-water liquid mixture is removed through said exit port and mixed with a crude salt and then used as said starting salt-water mixture liquid.

5. The method according to claim 4, wherein the liquid removed through said exit port is mixed with the crude salt after the liquid is passed through a filter.

6. A method for making salt wherein a starting salt-water liquid mixture is contained in a vessel and a gas is blown into the starting salt-water liquid mixture while a liquid portion of said starting salt-water liquid mixture is removed, wherein to said starting salt-water liquid mixture there is added an additive selected from the group consisting of extract of aloe, nemacystis, rice bran, turmeric, coral, carrot, ginseng, ink of cuttlefish, squalane, balsam pear and shell of crab, thereby precipitating the salt component of said starting salt-water liquid mixture and wherein the removed liquid is passed through a filter including coral sand and is mixed with a crude salt and then is used as said starting salt-water liquid mixture.

7. A method for making a salt wherein a starting salt-water liquid mixture is contained in a vessel and a gas is blown into the starting salt-water liquid mixture while a liquid portion of said starting salt-water liquid mixture is removed, thereby precipitating the salt component of said starting salt-water liquid mixture, wherein the removed liquid is passed through a filter including microorganisms and is mixed with a crude salt and is used as said starting salt-water liquid mixture.

8. A method for making a salt wherein a starting salt-water liquid mixture is contained in a vessel and a gas is blown into the starting salt-water liquid mixture to precipitate the salt component of said starting salt-water liquid mixture, wherein to said starting salt-water liquid mixture there is added an additive selected from the group consisting of extract of aloe, nemacystis, rice bran, turmeric, coral, carrot, ginseng, ink of cuttlefish, squalane, balsam pear and shell of crab, so as to add said additive to said precipitated salt.

9. The method according to claim 8, wherein said gas blowing is conducted while heating said starting salt-water liquid mixture.

10. An apparatus for making a salt comprising a vessel for containing a starting salt-water liquid mixture which includes a component salt and an additive selected from the group consisting of extract of aloe, nemacystis, rice bran, turmeric, coral, carrot, ginseng, ink of cuttlefish, squalane, balsam pear and shell of crab, wherein said mixture is prepared by mixing a crude salt or rock salt with bittern, a gas-blowing means for blowing a gas into said starting salt-water liquid mixture, an exit port provided in the bottom portion of said vessel, and a filter including microorganism provided in alignment with the exit port, wherein a gas is blown into said starting salt-water liquid mixture while a liquid portion of said starting salt-water liquid mixture is gradually removed through said exit port, and wherein the removed liquid is passed through said filter, thereby precipitating the component salt of said starting salt-water liquid mixture.

* * * * *